United States Patent [19]

Wright

[11] Patent Number: 4,932,724

[45] Date of Patent: Jun. 12, 1990

[54] WHEEL TRIM ATTACHMENT SYSTEM

[76] Inventor: James P. Wright, 1060 Robin La., Cookeville, Tenn. 38501

[21] Appl. No.: 308,194

[22] Filed: Feb. 9, 1989

[51] Int. Cl.⁵ .............................................. B60B 7/06
[52] U.S. Cl. ................. 301/37 S; 301/37 R; 301/108 S
[58] Field of Search ............... 301/37 R, 37 SS, 37 S, 301/37 SC, 108 R, 108 S, 108 SC

[56] References Cited

U.S. PATENT DOCUMENTS 3,092,420  6/1963  Baldwin et al. ............... 301/37 SC
3,918,764  11/1975  Lamme ........................ 301/37 AT
4,447,091  5/1984  Nguyen et al. .............. 301/37 SC X

FOREIGN PATENT DOCUMENTS 1160262  1/1984  Canada ......................... 301/37 AT
1172809  12/1969  United Kingdom .......... 301/37 AT
2046185  11/1980  United Kingdom .......... 301/37 AT Primary Examiner—Russell D. Stormer
Attorney, Agent, or Firm—Mark J. Patterson

[57] ABSTRACT

A system for attachment of decorative trim members to truck and recreational vehicle wheels is adaptable for use with varying makes of wheels. Specially configured brackets and retaining clips allow the attachment system to use wheel locator pins as a basis for securing and automatically centering the attachment system on the center of the wheel. Removal of existing wheel lug nuts is not required.

4 Claims, 4 Drawing Sheets

WHEEL TRIM ATTACHMENT SYSTEM

BACKGROUND OF THE INVENTION

The present invention relates to the attachment of decorative trim members to motor vehicle wheels and more particularly to trim attachment brackets and systems which are adaptable to a variety of wheels used on small, medium and large General Motors trucks, as well as recreational vehicles produced on various size chassis.

It is the desire of many owners of trucks and recreational vehicles to improve the cosmetic appearance of their wheels by adding decorative trim rings and the like, performing a function similar to standard hubcaps available on automobiles. Indeed, the prior art contains many examples of methods and brackets that have been developed to accomplish this. Some employ spring clips or hooks which engage the outer portion of the wheel under tension. Others use brackets which mount directly to the wheel lugs and, in turn, provide a central point for attachment of the wheel trim member.

Unfortunately, the prior art devices suffer from a number of drawbacks. For example, attachment brackets which rely on hooks or spring clips are susceptible to loosening under stress and are difficult to install in such a way that the trim member mounting point remains centered on the wheel. Further, most of these prior art attachment systems are undesirably complex, either in the number of components required and/or in the labor needed for installation. For example, installation of many of the prior art attachment systems calls for removal of some of the wheel lug nuts.

Also, the manufacturing cost of the prior art systems can be prohibitive because the attachment brackets and associated components are not universal, as they are designed to work with only one specific make of wheel. For example, although all 16 inch truck and RV wheels have a common bolt circle pattern, the differences between a 16 inch GM front and rear wheels wheel has in the past necessitated special, non-interchangeable mounting systems for each.

What is needed, then, is a system which provides a secure and consistently centered means for attachment of wheel trim members, which is easy to install, which is inexpensive to manufacture, and which is readily adaptable to more than one wheel configuration with a minimum of components.

SUMMARY OF THE INVENTION

In the present invention, a single wheel trim attachment kit is adaptable for use with large truck and RV wheels having a common bolt circle pattern (consistent distance from center to center of opposed wheel lugs) but otherwise having different physical configurations. The kits contain a rigid bracket which can be secured to the wheel without removing any wheel lug nuts and which coordinates with wheel locator pins to insure consistent centering of the attachment bracket. Separate bracket retainer clips are included for those installations where direct attachment to the locator pins cannot be employed.

The object of the present invention, then, is to provide a universal wheel trim attachment system and kit that can be used with more than one make of wheel.

Another object of the present invention is to provide a wheel trim attachment bracket and system that maintains a secure and consistently centered mounting point for the wheel trim and which is easy to install and remove.

DESCRIPTION OF THE PREFERRED EMBODIMENT

The wheel trim attachment system of the present invention is preferably supplied as a kit which would enable the purchaser to attach and secure conventional wheel trim members to large truck or recreational vehicle wheels supplied with a General Motors chassis and to transfer the trim member to another make of vehicle without further component modification or purchase. Accordingly, a kit derived from the present system comprises a front bracket 1 for use with 16 inch wheels having what is commonly referred to in the wheel industry as an 8 on 6.5 inch bolt circle pattern. However, it should be noted at the outset that the attachment system described and claimed herein can be adapted for use with wheels having different diameters and bolt patterns, by proportional adjustment of the size of the components, without departing from the spirit and scope of the invention.

Figure 1:
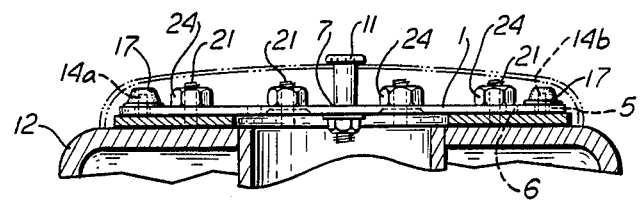
FIG. 1 is a side view of a General Motors 16 inch front wheel using the attachment system of the present invention to secure a decorative wheel cover, shown in phantom.
Figure 2:
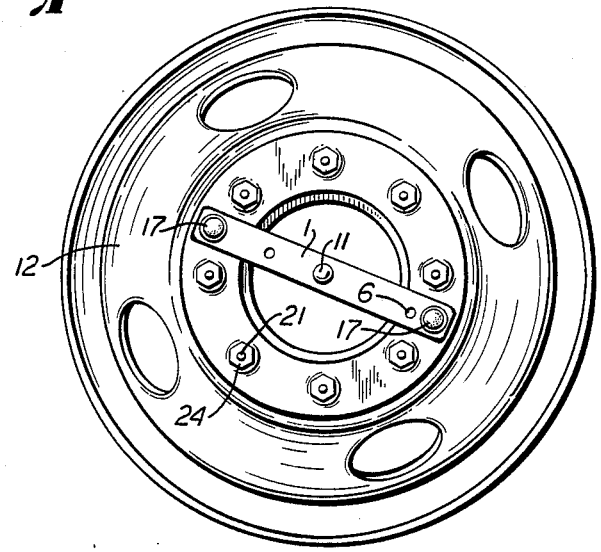
FIG. 2 is a top view of the attachment system adapted to a General Motors 16 inch front wheel.

Describing first the use of front bracket 1 on a General Motors wheel, reference is made to FIGS. 1 and 2. FIG. 1 shows front wheel bracket 1 secured to front wheel locator pins 14a and b of General Motors front wheel 12 by placing outer bracket holes 5 of bracket 1 over locator pins 14a and b. Bracket 1 is held in place by means of push-on fasteners 17 which are preferably fasteners of the Tinnerman or PDL Push Nut design. Fasteners 17 hold the distal portions of bracket 1 so that it abuts clamping plate 22 of front wheel 12.

On General Motors wheels, locator pins 14a and b are fixed approximately 19.2 centimeters apart and oriented such that center hole 7 of bracket 1 will be automatically aligned with the center point of wheel 12. Use of locator pins 14a and b as attachment points for bracket 1 also allows for rapid attachment and removal of the system without removal or adjustment of any lug nuts 24 from lugs 21.

After bracket 1 is secured to wheel 12, wheel trim member 23 is attached and automatically centered on wheel 12 through center hole 7 by means of retaining bolt, nut, and washer assembly 11. Preferably, the bolt of assembly 11 has a knurled head for ease of manual control. To speed installation, the nut of assembly 11 is preferably attached in conventional fashion to the underside of bracket 1. Alternative center hole securing means, such as an upward facing bolt permanently attached though center hole 7, can be used.

Figure 3:
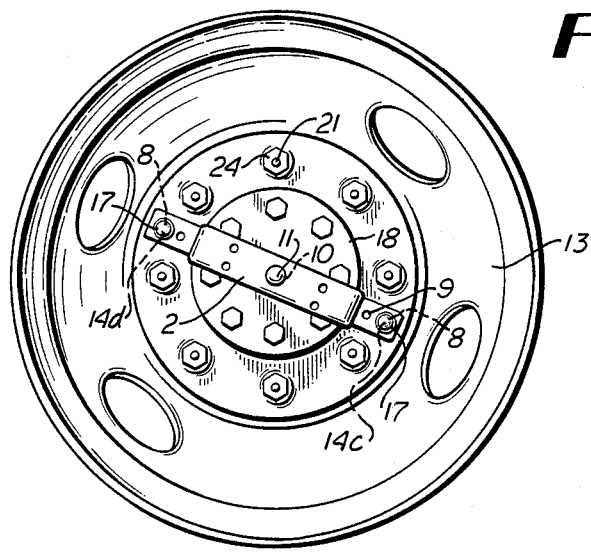
FIG. 3 is a top view of the attachment system adapted to a General Motors 16 inch dual rear wheel assembly.
Figure 4:
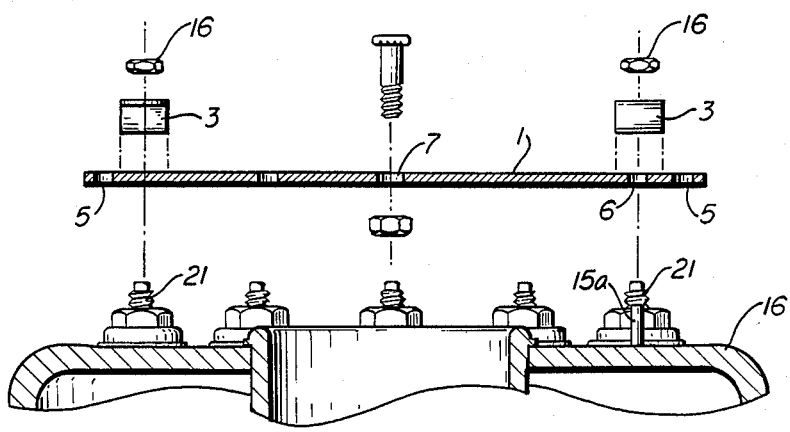
FIG. 4 is an exploded side view of the attachment system adapted to a 16 inch Ford front wheel.
Figure 5:
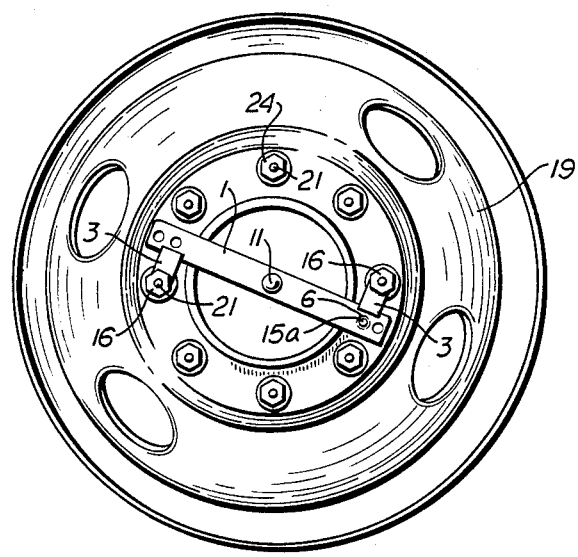
FIG. 5 is a top view of the attachment system adapted to a 16 inch Ford front wheel.
Figure 6:
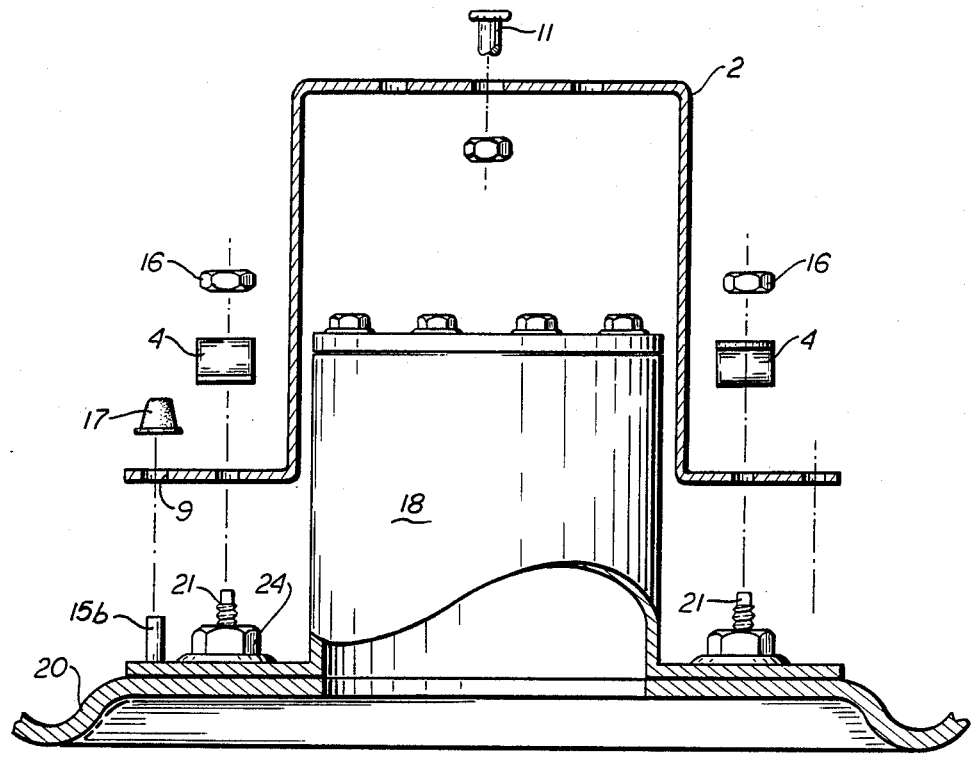
FIG. 6 is a side view of the attachment system adapted to a 16 inch dual Ford rear wheel assembly.
Figure 7:
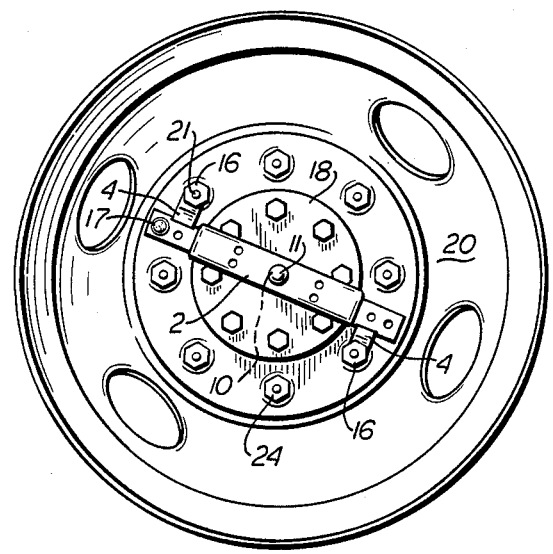
FIG. 7 is a top view of the attachment system adapted to a 16 inch dual Ford rear wheel assembly.
Figure 8:
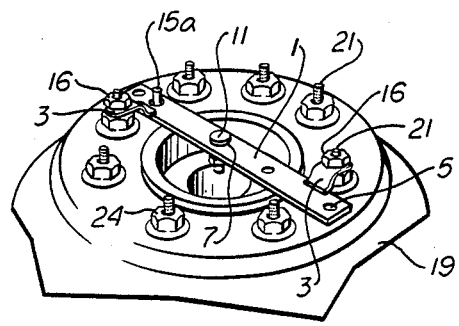
FIG. 8 is an isometric view of the attachment system on a Ford front wheel.
Figure 9:
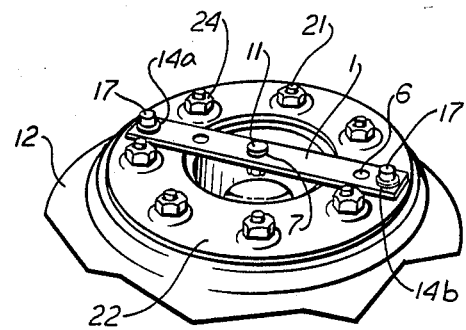
FIG. 9 is an isometric view of the attachment system on a GM front wheel.
Figure 10:
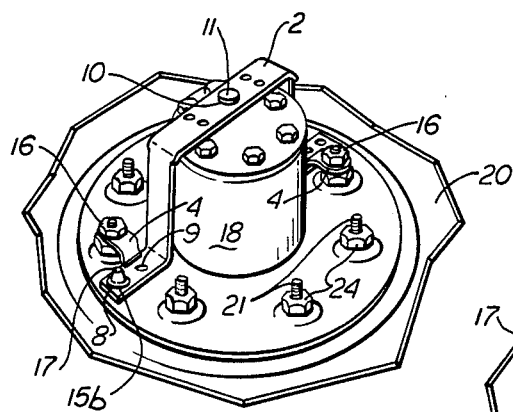
FIG. 10 is an isometric view of the attachment system on a Ford rear wheel.
Figure 11:
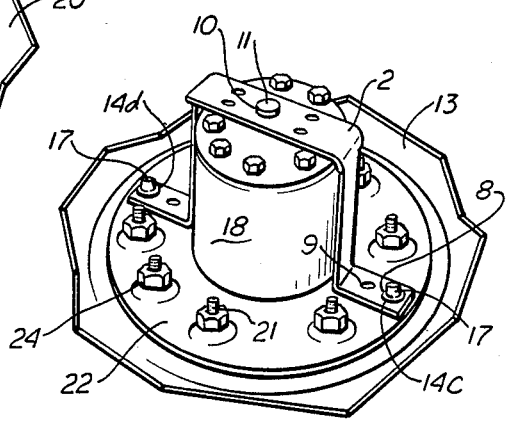
FIG. 11 is an isometric view of the attachment system on a GM rear wheel.

As seen in FIGS. 3, 6 and 7, rear wheel trim attachment is a somewhat different problem because of the use of dual rear wheels on larger trucks and RVs and because of the presence of rear axle hub 18. Accordingly, attached to General Motors dual rear wheel assembly 13, as seen on FIG. 3, is universal rear bracket 2 having generally a U-shape. As with front bracket 1, outer holes 8 of rear bracket 2 are placed over opposed wheel locator pins 14c and d and secured using push nut fasteners 17. Again, this automatically positions center hole 10 of bracket 2 over the center point of rear wheel 13. Rear wheel trim member 23 is then attached to wheel bracket 2 at center hole 10 using trim member bolt, nut, and washer assembly 11 as previously described. Further support for bracket 2 can be obtained by increasing the contact area with the side of axle hub 18 as shown.

Preferably, the bracket contact portion of bracket retaining clips 3 and 4 is formed to have a slightly greater than 90° angle with respect to the vertically extending segment. This improves the ability of Clips 3 and 4 to maintain tension against brackets 1 and 2 after auxiliary lug nuts 16 are torqued down on opposed lugs 21. Auxiliary lug nuts 16 can also be of the push-on type, if desired.

It can be seen, then, that the universal wheel trim attachment system and kit of the present invention will, for front wheel application, comprise a front bracket 1, two bracket retaining clips 3, two auxiliary lug nuts 16, two push nut fasteners 17, and a wheel trim member retaining nut, bolt, and washer assembly 11. The rear wheel kit will be identical except for the substitution of rear bracket 2. Comprised as such, each kit can be used with any General Motors truck or RV chassis having wheels with an industry standard 8 on 6.5 inch bolt circle pattern, or any other standardized wheel system with proportional adjustment of the size of the components.

What I claim is:

1. A decorative trim member attachment system for use with wheels conventionally secured to truck and recreational vehicle chassis, said wheel having a conventional wheel lug pattern and plural locator pins comprising:
   a. a bracket extending diametrically across said wheel whereby a hole through the center of said bracket is located at the center point of said wheel;
   b. said bracket having holes placed in the ends of said bracket which are adapted for engagement of said locator pins positioned on said wheel;
   c. means for securing the ends of said bracket to said wheel; and
   d. removable means for securing said wheel trim member to said center hole of said bracket.

2. The system of claim 1 further comprising: plural push-on fasteners adapted for the secure engagement of said locator pins.

3. A decorative wheel trim attachment kit adapted for universal use with front wheels used on General Motors trucks or recreational vehicle chassis, said wheels having a standardized wheel diameter and lug bolt center pattern and two integral diametrically opposed locator pins comprising:
   a. a rigid bracket having holes located at the opposed outer ends of said bracket adapted for engagement of said locator pins, said bracket further having a hole through its center;
   b. two removable fastener means for securing said bracket to said wheel; and
   c. removable means for securing said wheel trim member to said center hole of said bracket.

4. A decorative wheel trim attachment kit adapted for universal use with dual wheels used on General Motors trucks or recreational vehicle chassis, said wheels having a standardized wheel diameter and lug bolt center pattern and two diametrically opposed locator pins comprising:
   a. a rigid U-shaped bracket adapted to conform to a rear axle hub extending through said dual rear wheels, said bracket having holes located at the opposed outer ends of said bracket adapted for engagement of said locator pins, said bracket further comprising a hole through its center;
   b. two removable fastener means for securing said bracket to said wheel having diametrically opposed locator pins; and
   c. removable means for securing said wheel trim member to said center hole of said bracket.

* * * * *